(12) United States Patent
Johnson et al.

(10) Patent No.: US 7,580,933 B2
(45) Date of Patent: Aug. 25, 2009

(54) RESOURCE HANDLING FOR TAKING PERMISSIONS

(75) Inventors: David R. Johnson, Woodinville, WA (US); Robert F. Day, Bellevue, WA (US); Stephan Hoefnagels, Seattle, WA (US); Timothy P. McKee, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 422 days.

(21) Appl. No.: 11/191,070

(22) Filed: Jul. 28, 2005

(65) Prior Publication Data

US 2007/0027872 A1    Feb. 1, 2007

(51) Int. Cl.
*G06F 17/30* (2006.01)
(52) U.S. Cl. .................. 707/9; 707/1; 707/10
(58) Field of Classification Search .......... 707/1, 707/9, 10
See application file for complete search history.

(56) References Cited

U.S. PATENT DOCUMENTS

| | | | | |
|---|---|---|---|---|
| 6,236,996 B1* | 5/2001 | Bapat et al. | | 707/9 |
| 6,237,036 B1* | 5/2001 | Ueno et al. | | 709/225 |
| 6,279,111 B1* | 8/2001 | Jensenworth et al. | | 726/10 |
| 6,308,274 B1* | 10/2001 | Swift | | 726/9 |
| 6,549,916 B1* | 4/2003 | Sedlar | | 707/200 |
| 6,901,401 B2* | 5/2005 | Bangel et al. | | 707/9 |
| 6,941,456 B2* | 9/2005 | Wilson | | 713/160 |
| 6,990,492 B2* | 1/2006 | Gupta | | 707/9 |
| 7,013,312 B2* | 3/2006 | Bala et al. | | 707/200 |
| 7,350,204 B2* | 3/2008 | Lambert et al. | | 717/172 |
| 2002/0019941 A1* | 2/2002 | Chan et al. | | 713/185 |
| 2002/0077803 A1* | 6/2002 | Kudoh et al. | | 704/1 |
| 2002/0099952 A1* | 7/2002 | Lambert et al. | | 713/200 |
| 2002/0107749 A1* | 8/2002 | Leslie et al. | | 705/26 |
| 2003/0009685 A1* | 1/2003 | Choo et al. | | 713/200 |
| 2004/0193606 A1* | 9/2004 | Arai et al. | | 707/9 |
| 2005/0119902 A1* | 6/2005 | Christiansen | | 705/1 |
| 2005/0154888 A1* | 7/2005 | Chen et al. | | 713/168 |
| 2007/0011469 A1* | 1/2007 | Allison et al. | | 713/193 |
| 2007/0024890 A1* | 2/2007 | Murata | | 358/1.14 |

* cited by examiner

*Primary Examiner*—Don Wong
*Assistant Examiner*—Thanh-Ha Dang
(74) *Attorney, Agent, or Firm*—Shook, Hardy & Bacon L.L.P

(57) ABSTRACT

A file operations engine and other programming mechanisms are provided for handling file operations errors related to permissions. A file operations engine according to an embodiment of the invention manages many user interactions with their files via a computer system including options for taking a permission for a resource, such as a file, a folder or other object. The operations engine may enable another person to provide a user with a necessary permission for a resource. The operations engine or other programming mechanisms can provide dialogs and user interface mechanisms for handling permissions errors.

19 Claims, 8 Drawing Sheets

RESOURCE HANDLING FOR TAKING PERMISSIONS

BACKGROUND

Computer users interact with computer files through a copy engine, which is part of the operating system shell of the computer. The shell copy engine generates user interface (UI) dialogs, such as a progress UI dialog that illustrates progress of a copy operation and error dialogs that indicate conflict or permission errors. As used herein, a "dialog" includes a window, a message box, or another portion of a graphical computer display which appears in order to communicate information from a computer program and/or to obtain information from the user. Familiar examples are progress dialogs and error dialogs used in various versions of the WINDOWS operating system (available from Microsoft Corporation of Redmond, Wash.). A dialog often contains a brief message (e.g., "The folder already contains a file named "examplefile;" or "Would you like to replace the existing file with this one?") and one or more graphical buttons for possible user responses (e.g., "yes," "no," etc.).

Conventional copy engines manage the copying, moving and deleting of individual files or collections of files. These engines delete files by flagging them for removal, such as by placing them in a 'recycle bin,' 'trash can' or other temporary folder. They operate in a serial manner to perform a given operation in sequential order. When conventional copy engines encounter an error during an operation, they stop processing the operation and display a dialog for the error that requires user input. Processing continues after the user provides instructions for handling the error. This can be frustrating for a user. For instance, in a multi-hour copy operation, the error can occur 10 minutes into the operation after the user has already left the machine; the user will return several hours later expecting the process to be done (e.g., copying large files to a laptop for a trip) and find that only 10 minutes of processing has been completed.

Conventional file systems have security implementations, which restrict who is able to interact with a given file or folder. When a conventional copy engine of such a system is in the process of copying or moving files, it may encounter a file or folder for which the current user does not have permission certain permissions, such as to move or delete it. If so, the operation stops and the user is notified of the error. The user can subsequently try to figure out the file for which the user lacks the necessary permission. Once the file is found, if the user is authorized to set the proper permission, the user may do so and can retry the operation. If the user does not have proper authorization, the user is unable to perform the operation.

BRIEF SUMMARY OF THE INVENTION

The following presents a simplified summary of the drawings in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention provide methods, user interface displays, computer-executable instructions, and data structures for handling file operations errors related to permissions. A file operations engine is provided according to an embodiment of the invention that manages many user interactions with their files via a computer system. In one aspect of the invention, the operations engine may provide the user with options for taking a permission for a resource, such as a file, folder or other object. In another aspect of the invention, the operations engine may enable another person to provide the user with permission for a resource.

In addition, aspects of the present invention provide dialogs and user interface mechanisms for handling permissions errors. In other aspects, computer-executable instructions for implementing the disclosed methods are stored on computer-readable media. These and other aspects are addressed in relation to the figures and related description.

BRIEF DESCRIPTION OF THE DRAWINGS

A more complete understanding of the present invention and the advantages thereof may be acquired by referring to the following description in consideration of the accompanying drawings, in which like reference numbers indicate like features.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

In accordance with aspects of the present invention, a graphical user interface (GUI) is provided on a computer for displaying output on the system's monitor and for managing user input. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As an example for illustrating aspects of the present invention, a system GUI is discussed, which may include an operating system GUI such as the GUI of a MICROSOFT WINDOWS operating system that may include the Win32 subsystem (Win32). In these examples, the Win32 subsystem may have exclusive responsibility for displaying output on the system's monitor and for managing user input. Architecturally, this means that the other modules may need to call Win32 subsystem functions to produce output on the display. It also means that the Win32 subsystem may need to pass user input actions to the other modules when the user interacts with their folders. In addition, it means that system commands, such as commands to copy files, may initially be captured by the Win32 subsystem. It is understood that with other operating systems and other types of system level user interfaces may be responsible for monitoring and managing user input.

Example Computing System Environment

Figure 1:
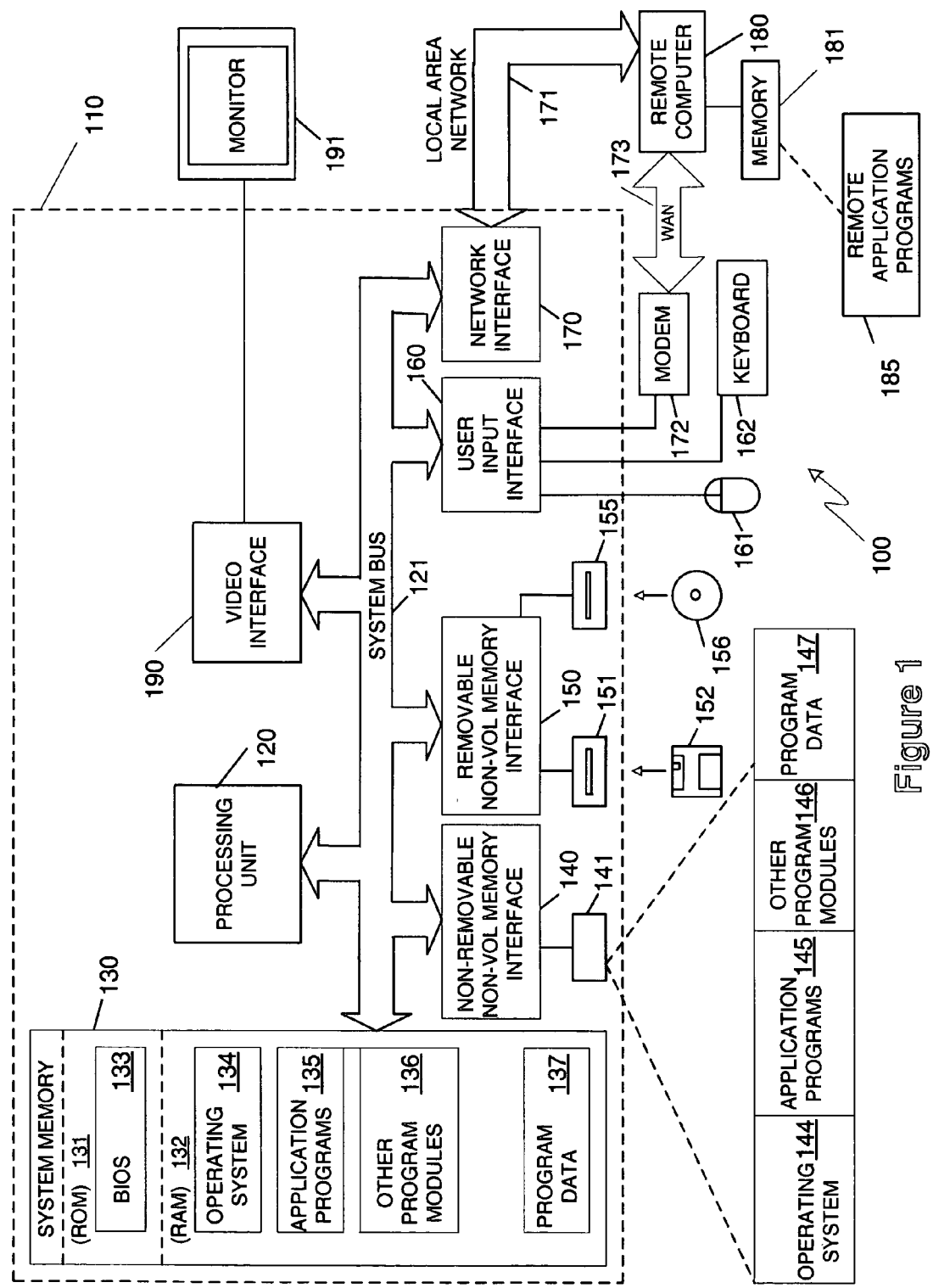
FIG. 1 is a functional diagram of a general-purpose computer supporting one or more aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Exemplary computer system environment 100 for implementing the invention includes a general purpose computing device in the form of a computer 110. Components of computer 10 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 134, application programs 135, other program modules 136, and program data 137. Note that these components can either be the same as or different from operating system 134, application programs 135, other program modules 136, and program data 137. Operating system 134, application programs 135, other program modules 136, and program data 137 are given different numbers here to illustrate logical differences.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers and printers, which may be connected through an output peripheral interface.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Operating System

Figure 2:
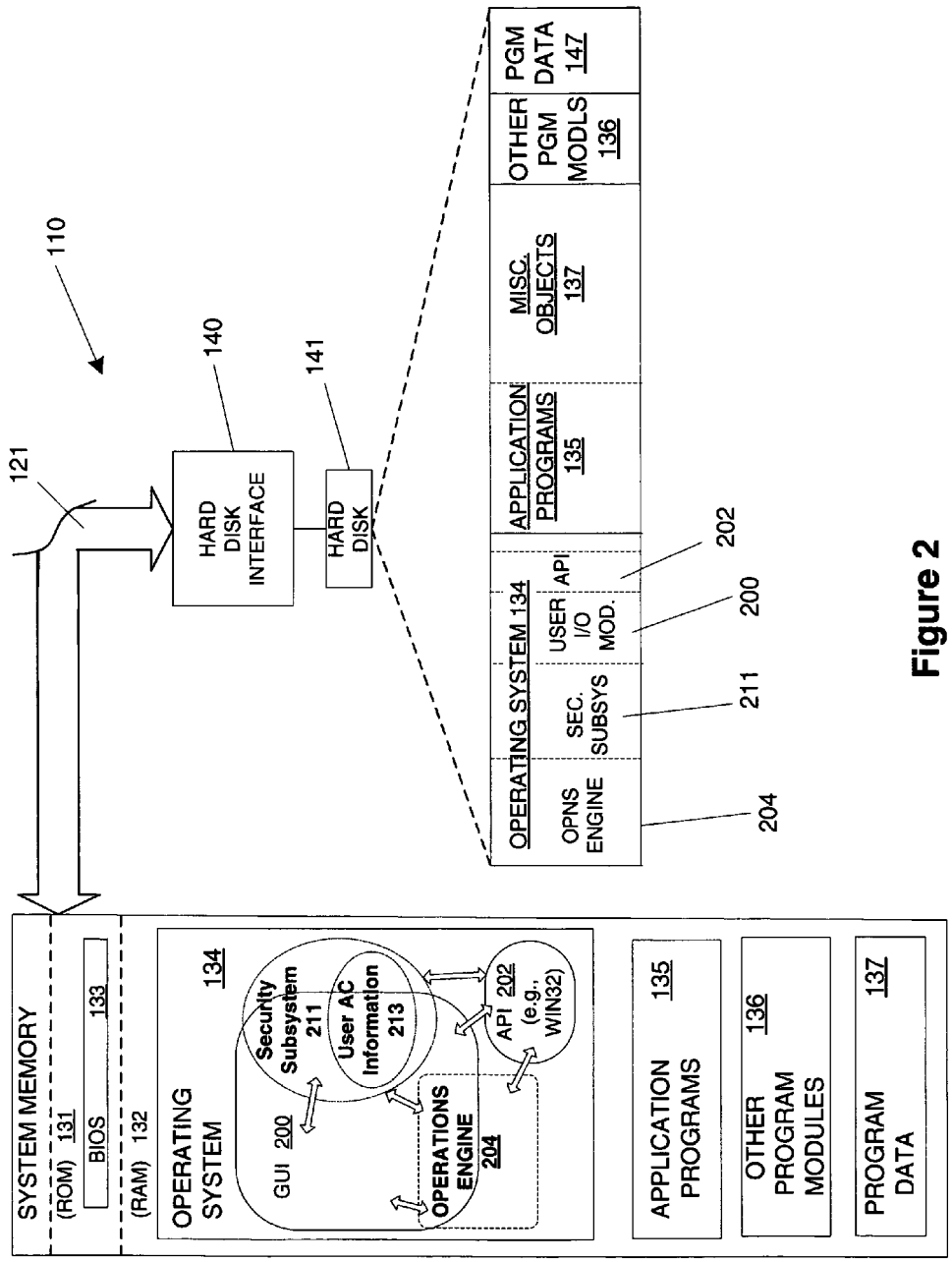
FIG. 2 is a close view of portions of the functional diagram of FIG. 1.

FIG. 2 shows a closer view of functional portions of computer 110 to illustrate an example configuration using a MICROSOFT WINDOWS operating system for operating system 134. In this example, operating system 134 includes a GUI 200, a user interface application programming interface (API) 202, an operations engine 204, and a security subsystem 211, which could be a part of the operations engine. Operating system 134 may be a version of the MICROSOFT WINDOWS operating system, such as MICROSOFT WINDOWS 95, 98, NT, 2000 or XP. GUI 200 is the operating system user interface that displays output on the system's monitor and manages user input. User interface API 202 is a type of interface that, with respect to versions of the MICROSOFT WINDOWS operating system, permits computer programs to host (i.e., control) folders within GUI 200 provided by the operating system. For the embodiments discussed herein, the folders are of a predetermined type as dictated by the operating system—e.g., folders of the MICROSOFT WINDOWS operating system. API 202 may be the API known within the art as the WIN32 API. The WIN32 API is utilized for, among other functionality, to provide for the hosting of folders by application programs running within the MICROSOFT WINDOWS operating system.

In general, operations engine 204 is a file operations system that permits users to interact with files, such as to move, recycle (i.e., delete files by moving them to a recycle bin), and copy files. It may also permit users to expunge files (i.e., permanently remove the files), rename, set access control lists (ACLs), encrypt, compress, and/or set properties for files. The operations engine provides user interface dialogs and receives user commands related to file operation commands, and manages file operations. For instance, the operations engine receives and manages a user's request to move certain files from one location to another. In another example, the operations engine manages and interacts with the user during installation of a new program. The operations engine 204 runs as part of the shell process. However, in other embodiments, the operations engine may be extensible, and/or portions of it may be extensible, to allow for the creation and expression of new file operation rules, methods, and/or dialogs as needed.

The security subsystem 211 generally protects objects, files, applications and other resources from unauthorized use. It doing so via the use of access control (AC) information, access control lists (ACLs), security groups, group policies and/or other mechanisms. These mechanisms permit the security subsystem to provide flexible access control to the user's local resources, as well as to resources accessible via a network. Although shown in FIG. 2 as logically separate from operations engine 204, security subsystem 211 may be a part of the operations engine or integrated therewith. As further shown, the access control information 213 may be stored as part of the security subsystem. However, it may be partially or completely stored apart from the security subsystem and may reside on other storage media. Security subsystem 211 will be discussed further along with FIG. 3 in an example embodiment that can support various aspects of the invention.

As further shown in FIG. 2, application programs 135 are programs running or that may run within operating system 134. For example, the programs may be application programs such as word processing programs, spreadsheets, web browsers, etc. In operation, when any of the programs, GUI 200, operations engine 204, security subsystem 211 or other program modules 136 needs to host a folder within GUI 200, it calls a function defined within WIN32 API 202, as is known within the art. WIN32 API 202 returns a handle, or identifier, referencing the folder that it created within GUI 200 provided by operating system 134. Those of ordinary skill within the art will appreciate that while computer 110 has been described in relation to the MICROSOFT WINDOWS operating system, folders of the MICROSOFT WINDOWS operating system, and the WIN32 API, the invention is not so limited.

Example Access Control Mechanisms

Figure 3:
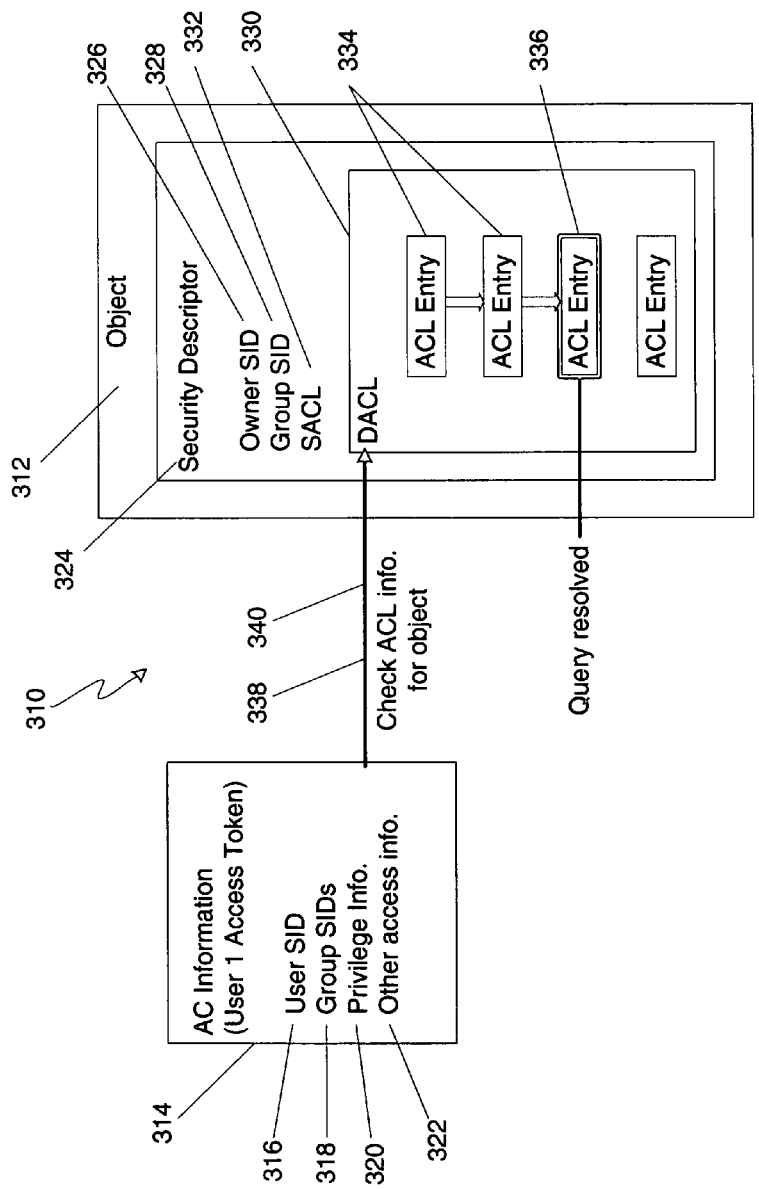
FIG. 3 illustrates access control mechanisms of the computer of FIG. 1 according to an embodiment of the invention.

FIG. 3 shows an example scenario to illustrate access control mechanisms of computer 110 and an example method 310 for handling permissions. In the example shown, a user is requesting that an action be performed on an object 312, such as a file, a folder, a printer, etc. It is understood, however, that method 310 is merely an example method for an example access control scenario, and numerous other scenarios and applicable methods are possible. For instance, rather than a user, another entity such as a group, a computer, or a service may be causing the action to be requested. For the present scenario, the access control (AC) data 314 corresponds to data for the user of computer 110 of FIG. 1 in the form of token.

When the user logged on to the computer, an access token 314 was created from the AC data 213 (FIG. 2) for the user. Access token 314 is generally a data structure that contains security information for the user. For example, as discussed further below, access token 314 may include a security identifier (SID) 316, group SID information 318 for the user, privilege information 320, and other information 322, such as default security information for new objects created by the user. An access token may be created for every security entity, which is generally an entity that can be authenticated and/or that logs on to the computer either locally or remotely. Each process performed on computer 110 may have a primary access token that provides a security context for the entity's actions on the computer, as well as for any application threads that act on the entities behalf. When an object is created, the security information for the object may be obtained from the primary access token for the entity that created it or it may be inherited by default from the process that creates it.

For the example of FIG. 3, the security information for object 312 may be stored as security descriptor data 324. The security descriptor data may identify which user owns object 312, which users or groups are allowed or denied access to it, and which users' and groups' access needs to be audited. The security descriptor data may be provided initially for the object or it may be inherited from a parent object. For instance, object 312 may be a file within a folder (not shown) of an application that was installed by a system administrator. As such, security descriptor data 324 may be security information from the primary access token of the administrator, which was inherited from the application acting as a parent object for object 312. Thus, security descriptor data for objects may be inherited by propagating the access control information down through a tree of objects. In addition to initially be inherited when object 312 was created, the inherited security descriptor data 324 may change as the parent object's security descriptor data is changed. As a result of inheritance or other mechanisms that can change the security descriptor data for an object, access rights and permissions may change for an object. Thus, an entity may expect to have certain permissions for a resource, but may find out that those permissions have changed when the entity attempts to perform an operation for the resource.

For the example scenario of FIG. 3, the user may have access rights for object 312, as well as certain permissions to it. As used herein, a right (also be referred to as a privilege) is generally an authorization to perform an access control operation for a resource, whereas a permission is generally an authorization to perform another operation for the resource, such as to open, copy, move, modify it, etc. More particularly, for the example computer system 110, a right is an authorization to allow or deny access to a resource, such as to object 312. Thus, an entity with rights to a resource can grant or deny permissions for the resource. Further, for computer system 110, rights are inherent for a resource that the entity owns. Thus, if a user is indicated as being the owner of a resource like object 312, the user inherently has access to that object and can allow or deny levels of access to others. Likewise, ownership of a resource means that the identified owner has access to the resource and may modify the ability for others to access the resource.

For the example computer system 110, only one entity may be the current owner of a resource. However, multiple entities may be identified in the security descriptor information of the resource as being authorized to be an owner of the resource. For instance, administrators and entities belonging to other groups may have the right to take ownership of particular resources according to the security description information for the resource. However, only one owner exists at a given time. In other words, multiple entities may have permission to take ownership of a resource, which may have been granted to them by the initial owner. Maintaining a single owner at any particular time for a resource can enhance an organization's security and stability. However, it can create situations where an entity that has permission to be an owner of a resource, but that is not the current owner, may lack permission to perform an operation on the resource that the entity could otherwise grant to itself if it were the current owner.

As noted above, a permission in the context of the example computer system 110 is an authorization to perform an operation for an object, such as object 312. Permissions are granted by owners. Thus, if a user owns an object, the user has the right to grant permissions to other entities, such as other users or groups. However, when permission to perform an operation is not explicitly granted, it is implicitly denied. Each permission that an object's owner grants to a particular user or group is stored as part of the object's security descriptor.

As shown in FIG. 3, information contained in security descriptor 324 for object 312 includes owner security identifier (SID) information 326, which identifies the object's current owner and Group SID information 328, which identifies groups of entities that have permissions for the object. Security descriptor 324 may further include a discretionary access control list (DACL) 330 if permissions are configured for object 312 beyond a single owner. The DACL identifies SIDs for users or groups that are allowed or denied permissions for the object, as well as a system access control list (SACL) 332 that controls how security subsystem 211 (FIG. 2) audits attempts of entities to access object 312. Access control entries (ACEs) 334 are ordered lists of the DACL that define the permissions of entities for the object and their properties.

As further shown in FIG. 3, access token 314 for the user may include security identifier (SID) information 316 for the user, group SID information 318 for groups of which the user is a part, privilege information 320, and other information 322, such as default security information for new objects created by the user. SID 316 is generally a unique identifier within an enterprise for a security entity that can be authenticated. Group SID information 318 generally provides unique identifiers within the enterprise for any groups of which the entity is a part, such as a domain of which the current user is a part. Group SID information can be useful for providing common access control parameters to resources for a group of entities. Privilege information 320 generally identifies rights that the entity has, such as the current user's rights on the computer 110.

User-Based Authorization

FIG. 3 further illustrates steps performed via security subsystem 211 during an example security check method 310. For the example computer 110, applications, modules, engines, etc. that a user invokes generally run in the security context of that user. When such a program runs, it runs as a process with threads of execution. When it performs an operation on a user's behalf, one of the threads performs the operation. For example, if the current user of computer 110 desires to move or copy object 312, operations engine 204, rather than the user, actually moves or copies the object via a thread of execution. In order for the thread to gain access to object 312, it identifies itself to security subsystem 211. Threads and their respective programs typically do not have a security identity, so they borrow one from the user or other entity invoking them. Thus, when the user invokes operations engine 204, it runs any processes within the user's logon session.

When one of its threads needs to move object 312, the thread identifies itself as the user's agent by presenting the user's access token 314. The user is therefore ultimately responsible for anything that the thread does to the file or system on the user's behalf. Before allowing the thread of execution to proceed, security subsystem 211 performs an access check to determine whether the user associated with the thread has the degree of access that the thread has requested. Such an access check is illustrated as example security check method 310. As shown, security subsystem 211 performs the step 338 of checking the object's security access identifier (SID) 326 for a match with the user's SID, as well as the group SID 328 if the user is part of a group.

Security subsystem 211 further performs the step 340 of checking the discretionary access control list (DACL) 330 to search for access control entries (ACEs) 334 that apply to the user and/or group SIDs referenced in the thread's access token 314. If a DACL does not exist and the user's SID is identified as the owner, then access is granted because the user has full permissions. Otherwise, the security subsystem performs the step of proceeding through the DACL until it finds any ACEs 334 that either allows or denies access to the user or one of the user's groups. If a deny is found at the user or group level, the access is denied.

If security subsystem 211 comes to the end of DACL 330 and the thread's desired access is still not explicitly allowed or denied, security subsystem 211 denies the user access to object 312. Therefore, if a DACL exists, but is empty, access may be denied. Further, if the user is identified under owner SID 326 to be the owner of object 312, but the DACL 330 does not indicate the necessary permission, access may also be denied.

If the user is not shown in owner SID 326 to be the current owner, but is identified in the DACL 330 as having permission to be the owner without having permission for the requested operation, access may nonetheless be denied. However, such a situation may be remedied by the user taking ownership of the object and granting to itself the necessary permission. Thus, the user may gain permission to perform the requested operation by manually searching for object 312, changing ownership to show the user as the owner, and then granting the desired permission. However, such a manual process can be time-consuming and inefficient.

Take Permissions

In the previous sections, an overview of the operation of an example computer 110 was described, as well as an access control configuration and an access control method. In this section, embodiments illustrating aspects of the present invention will be discussed using computer 110 for illustration purposes, as well as the access control configuration and methods of FIGS. 2 and 3. It is understood that the invention, as well as the following embodiments, may be used with a variety of other computer systems.

Figure 4:
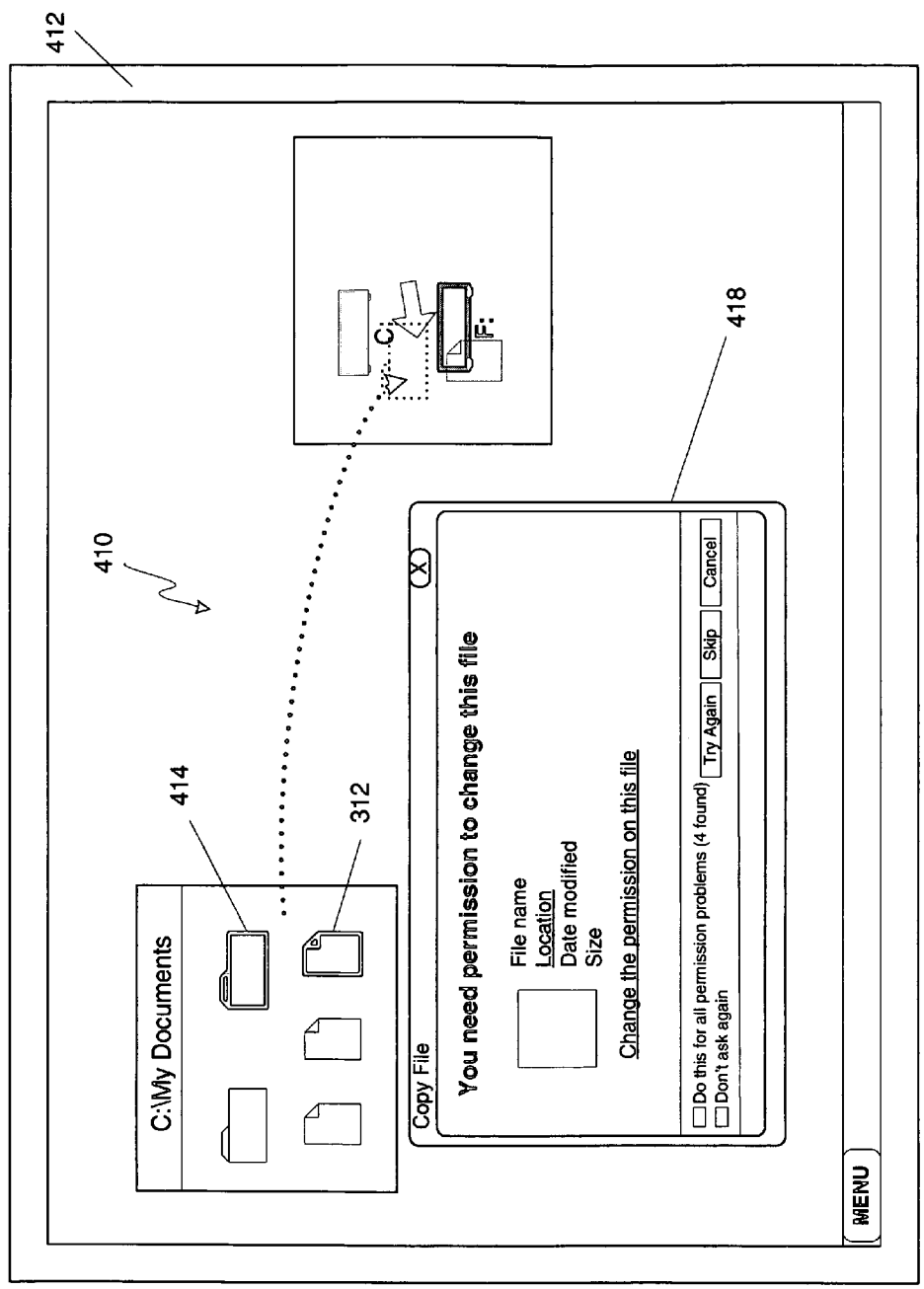
FIG. 4 shows a graphical user interface display on the computer of FIG. 1 according to an embodiment of the invention.
Figure 5:
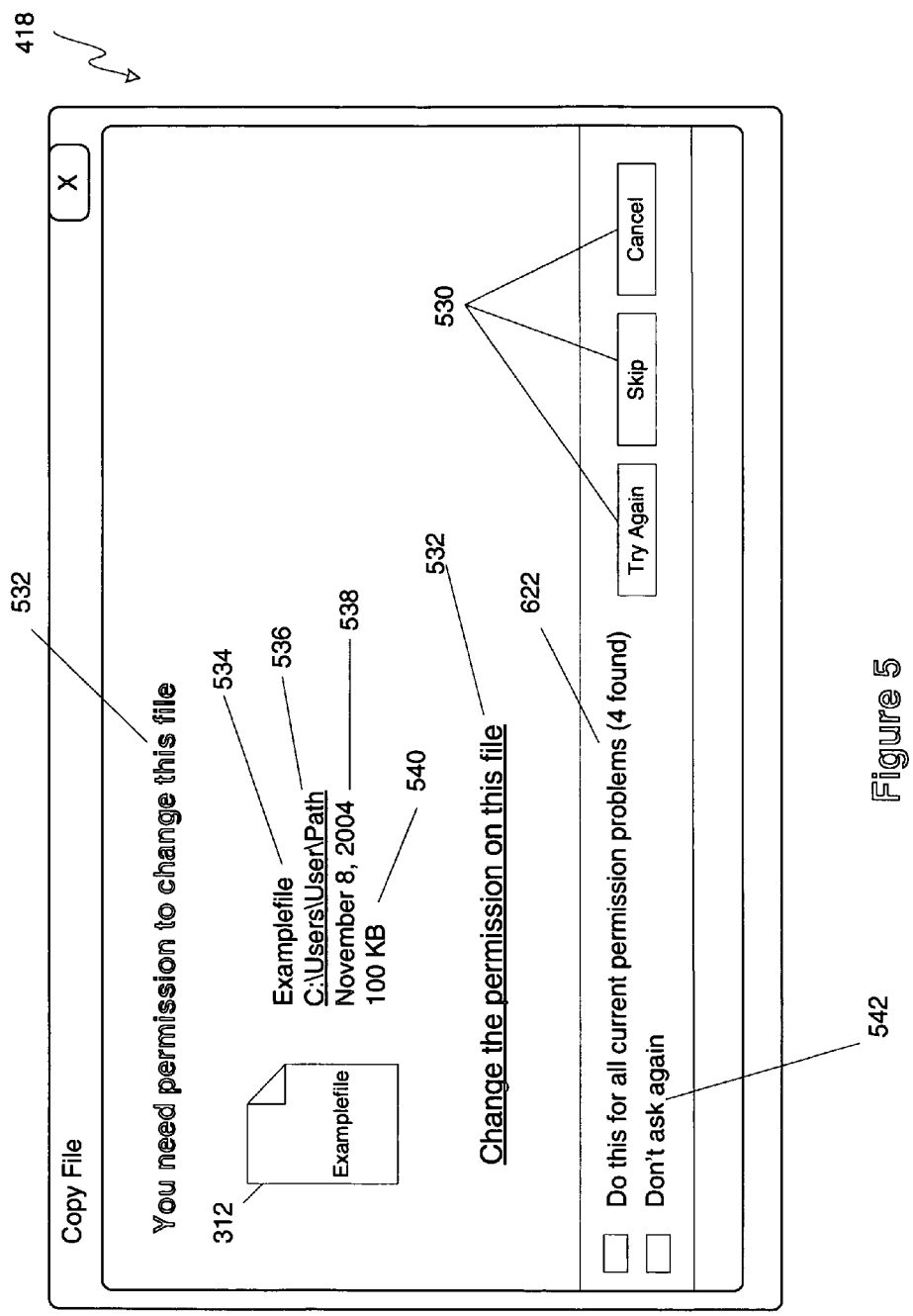
FIG. 5 shows a dialog that may be shown on the display of FIG. 4 according to further embodiments of the invention.

Referring now to FIGS. 4-8, computerized methods, user interfaces, and computer-readable instructions according to embodiments of the invention are generally shown. FIGS. 4 and 5 show a graphical user interface display 410 on the monitor 412 of the computer of FIG. 1 according to an embodiment of the invention, which is generated by GUI 200. For the embodiments discussed hereafter, GUI 200 provides to the user interface displays and monitors the system for user inputs. Operations engine 204 and security subsystem 211 cooperate with, and/or may be a co-extensive with, the GUI. Thus, the program instructions of operations engine 204 and/or security subsystem 211 may be a part of GUI 200 or may be partially or completely extensible from the GUI. Alternatively, operations engine 204 and/or security subsystem 211 may include program instructions outside of operating system 134 that provide some of the functionality discussed hereafter. In addition, operations engine 204, security subsystem 211, and/or GUI 200 may be protected subsystem code operating within a user mode portion of operating system 134.

User interface display 410 of FIG. 4 is an example display that is provided after a user has requested a file copy operation. In the example shown, the user has requested that folder 414 and file 312 in the folder "My Documents" on the user's C drive be copied to the F drive. The requested copy operation may be requested by various mechanisms, such as by the user selecting folder 414 and file 312 via a remote control device, a mouse, or another input device. The display includes a dialog 418 that informs the user that the user lacks permission to copy file 312 as part of the requested operation. As shown, dialog 418 notifies the user of the error and provides options for dealing with the error.

As further shown in FIG. 5, dialog 418 includes an error message 532, the name 534 of the affected object, which in this case is file 312, and provides general options 530 for dealing with the error, such as trying the operation again, skipping the operation involving file 312 and the identified error, or canceling the operation. Dialog 418 further provides a correction option 532 for correcting the error by changing one or more permissions for file 312. Dialog 418 may also show the name 534 of the affected object, which in this case is file 312, its location 536, the date 538 it was last modified, and its size 540. Dialog 418 may also provide related options 542 for handling similar errors that may be encountered as the requested copy operation proceeds.

In conventional copy engine systems, when the system encounters a lack of permission error for an object, the error is thrown and the operation stops. The user is then required to search for the object to modify its permission. Once located, the user may need to evaluate the permission model of the object and determine how to grant the necessary permission. For example, the user may need to first determine whether the user is the owner of the object and, if not, whether the user has been granted permission to take ownership of it. If the user is not the owner and cannot take ownership of the object, the user may need to determine who has ownership or who can take ownership and then request the necessary permission(s). Such a process can be complicated and inefficient for the user. In addition, when users are performing an operation on an entire series of files and encounter such an error, frequently users will hit the cancel button (rather than fixing permissions and hitting try again, or hitting skip to skip this individual file). This can create problems, as it cancels the entire operation and typically does not restore the user's file system to the state it was in before the operation was started. Thus, the user might be left with a file they can't operate on and a file system that might be in a non-deterministic state.

Figure 6:
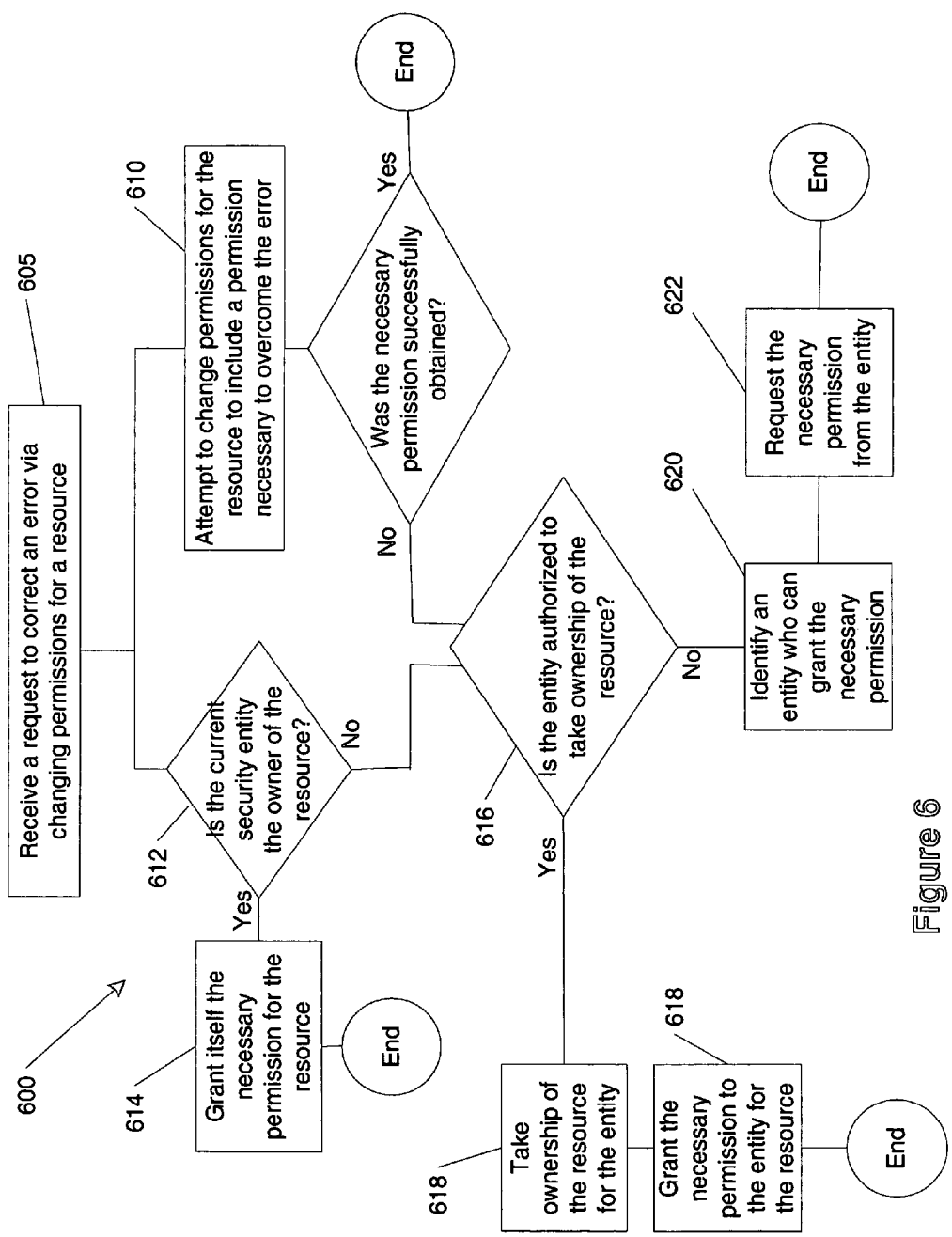
FIG. 6 is a flow diagram illustrating a method for handling permissions according to embodiments of the invention.

As illustrated by the correction option 532 of FIG. 5 and the method of FIG. 6, a simple mechanism is provided for solving permission errors encountered during an operation. When the user selects correction option 532, operations engine 204 attempts to acquire the necessary permission(s) for object 312 via method 600. Although discussed in the present configuration as being directed by the operations engine, it is understood that the security subsystem 211 and/or other program instructions may direct some or all steps of method 600 or may cooperate with the operations engine to effectuate the method. Necessary permissions may be acquired by invoking the current mechanisms for changing permissions that the user could manually perform. For example, operations engine 204 presently permits the user to manually request the display of access parameters in one or more dialogs (not shown) for an object and to manually request changes to them via interactions with dialogs. When the user selects correction option 532, the operations engine may simply provide instructions to automatically modify the permissions in a similar manner to which the user could have manually requested modification of the permissions.

As shown in FIG. 6, when the user selects correction option 532, which the operations engine receives in step 605 as a request to correct an error via changing permissions, the operations engine performs the step 610 of attempting to change the permissions of object 312 to include the necessary permission for the requested option (e.g., acquire permission to copy file 312). Step 610 may include the step 612 of determining whether the user is currently the owner of the object and therefore has the ability to grant the necessary permission, in which case it may proceed to perform the step 614 of acquiring the necessary permission as if the user had manually made such a request. Alternatively, step 610 may simply be performed as an attempt to change permissions without initially determining whether the user is currently the owner per step 612. If the necessary permission for file 312 is acquired for the user, then the method ends and the operation of copying file 312 continues.

If the necessary permission is not acquired, then the operations engine performs the step 616 of determining whether the user is authorized to take ownership of the object and thereby grant itself the permission. For example, the current user may be part of group that is authorized to take ownership of file 312, such as a member of an administrator group. As such, the current user would have a group SID for the administrator group, for which members are authorized to take ownership of file 312 according to its security descriptor information. Such a scenario may commonly be encountered in a network configuration where multiple can use the computer. Each user may have files set such that only that user can use the files. An administrator might not have permissions for a particular object on the computer, but may need to gain permissions to perform certain administrative operations, -such as periodically backing up all files on the computer. In another example, an administrator may purposefully restrict permissions on an object to prevent inadvertent alterations to a good draft of a document.

Step 616 may include an explicit evaluation of the security descriptor of file 312 to determine whether the user can take ownership. If the current user is authorized to take ownership of file 312, then operations engine performs the step 618 of taking ownership of file 312 followed by step 620 of granting the necessary permission (e.g., copy permission for file 312). Alternatively, step 616 may simply include attempting to perform step 618 to take ownership of the object. If ownership is obtained for the user, the operations engine performs the subsequent step 614 of acquiring the necessary permission as if the user had manually made such a request. If the necessary permission for file 312 is acquired for the user, then the method ends and the operation of copying file 312 continues. If not, then the operations engine may perform the step 620 of identifying an entity who can grant the necessary permission, and then perform the step 630 of requesting the necessary permission from the entity. The entity identified in step 620 may be the current owner of object 312. If that entity is unavailable, other entities having authority to take ownership of object 312 may be identified and contacted for requesting that the necessary permission be granted. Of course, a non-owner entity may need to take ownership of object 312 in order to grant the necessary permission to the user.

Figure 7:
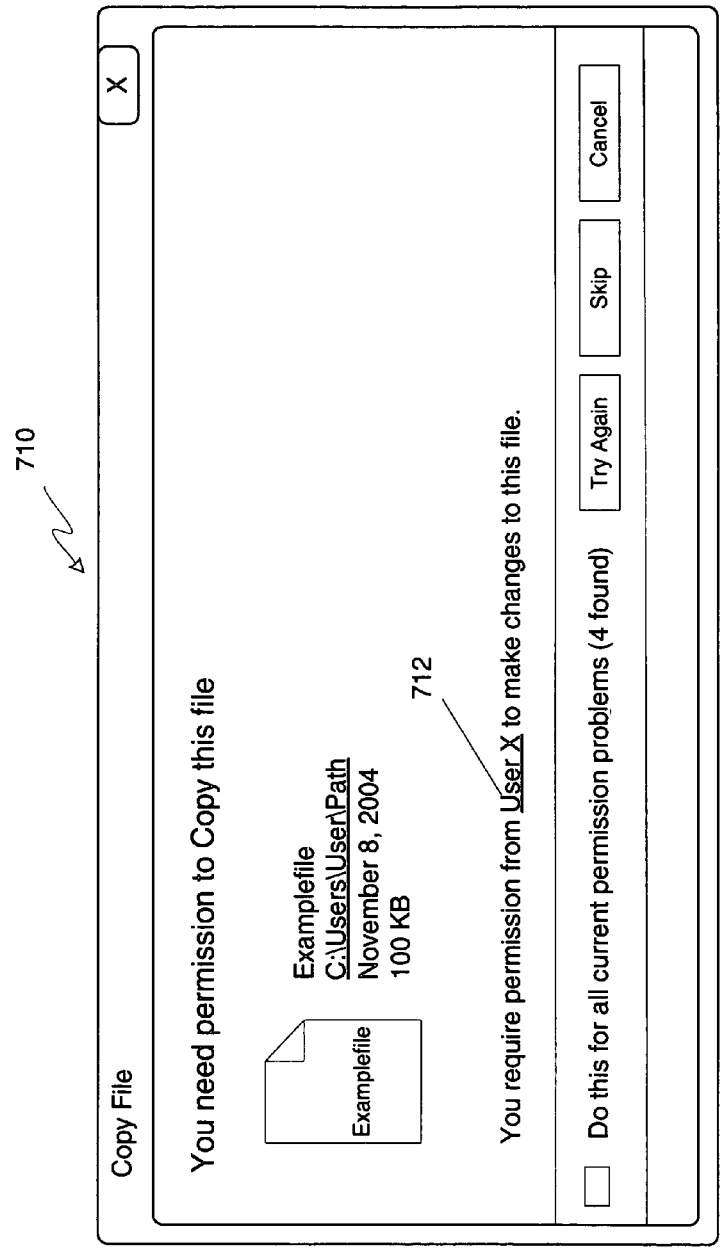
FIG. 7 shows a dialog that may be shown on the display of FIG. 4 according to additional embodiments of the invention.

FIG. 7 shows a dialog 710 that may be shown if the user cannot change the permissions for file 312, such as may occur if the user does not have permission to become an owner of the file. Such a dialog may be shown prior to step 620 of FIG. 6. For example, a user on computer 110 might not have ownership privileges for file 312 and might not be an administrator or a member of any other group having ownership privileges for file 312. For instance, a network administrator may have installed files on computer 110 for an application that the users of the computer should not be able to copy. However, there may be situations where it is desirable for the user to obtain permission to copy the file, such as for a personal backup of computer 110. As such, it may be beneficial to provide a simple mechanism for requesting a necessary permission from an administrator or other entity when needed.

As shown, dialog 710 identifies the user from whom permission can be acquired (e.g., User X in the example shown), and includes an actionable link 712 to that user. Other than details related to Dialog 710 are generally the same as Dialog 510 of FIG. 5. Actionable link 712 may be a link to an email system, an instant messaging system, or other type of application, from which the user can request the necessary permission for the copy operation. Selecting link 712 may, therefore, automatically launch a new email or other type of message dialog (not shown) requesting the necessary permission, which the user can modify and send to User X. Certain fields of the message dialog may be filled out automatically, such as the contact information (e.g., email address) of the other user (User X) and a sample message body.

In another configuration, user selection of link 712 may automatically send a standard message to User X based on default information. For instance, a new email message (not shown) may automatically be prepared and sent to User X that identifies the resource (e.g., file 312) for which the user needs permission, the type of permission(s) required, contact information for the current user, and other default information. Once User X grants the necessary permission, another dialog (not shown) may notify the current user when permission has been granted and then the operation may continue.

Figure 8:
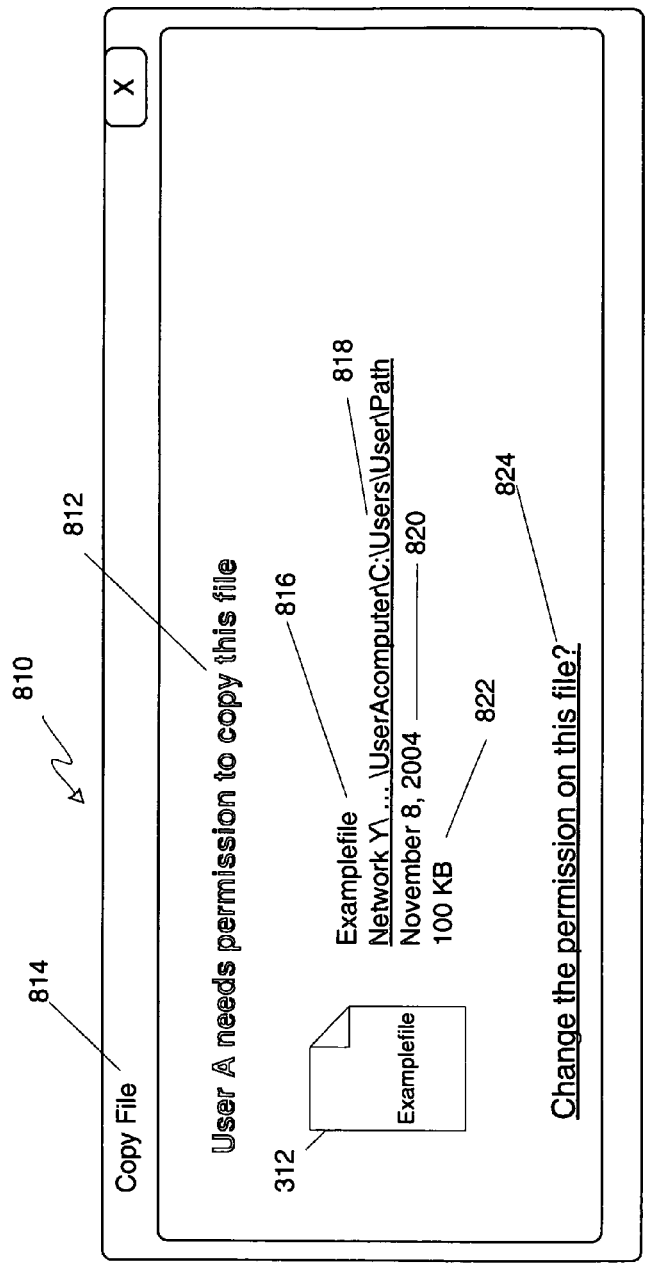
FIG. 8 shows a dialog that may be shown on a display of another user's computer according to further embodiments of the invention.

In another configuration shown in FIG. 8, a link to object 312 and a short description of the permission(s) needed may be sent to User X. This can further simplify the process by reducing the burden on User X to find and locate the resource in order to change its permission. As shown in FIG. 8, a dialog 810 may identify the required permission 812 and the associated operation 814, as well as identify the resource 312, its name 816 and its location 818. It may also identify other information about the resource, such as its creation date 820 and size 822. Dialog 810 may also provide an actionable link 824 to invoke programming, such as an operations engine on the computer of User X, through which User X may change permissions of file 312. Link 824 may include parameters for changing permissions of the object, such as the network location of the object and the permissions required, which are provided to the operations engine on the computer of User X. Thus, without needing to search for object 312, User X can select link 824 when dialog 810 or a similar message is provided to User X to effectuate the necessary change in permissions.

Method 600 and dialogs 510 and 710 illustrate the ease with which permissions related errors may be corrected during an operation without requiring a security entity, such as the current user, to search for a resource for which the entity lacks a necessary permission. In the example of dialog 510, a single command entry entered by the user to select correction option 532 can obtain the necessary permission and permit the operation to continue. In the example of dialog 710, an additional command entry from the user may be needed to select actionable link 712. However, actions required of user X are also simplified, as user X will not need to search for the resource and may also be able to change the necessary permissions via selection of a link 824 presented to user X.

Aspects of the present invention have been described in terms of illustrative embodiments thereof. Numerous other embodiments, modifications and variations within the scope and spirit of the appended claims will occur to persons of ordinary skill in the art from a review of this disclosure. In particular, it is understood that aspects of the invention may practiced with a large variety of computing devices, including personal computers, mobile devices, PDAs, and mobile terminals. In addition, it is understood that aspects of the invention may generally be practiced without user interaction. For example, a first program, rather than a user, may request access to a resource for which the entity associated with the first program lacks permission to access. The first program may subsequently interact with an operations engine or a second program to attempt to change permissions for the resource.

What is claimed is:

1. One or more computer storage media having computer-executable instructions for performing steps comprising:
   receiving, at an operations engine of a computer system, an operations request to perform an operation for a resource of the computer system, the operations request is associated with a user identified by a security system of the computer system;
   determining whether the user lacks permission for the operation based on at least one security identifier (SID) associated with the resource and at least one discretionary access control list (DACL) associated with the resource, wherein the DACL identifies SIDs for one or more users that are either permitted or denied permission to access the resource;
   initiating performance of the operation if the user has permission for the operation;
   if the user lacks permission for performing the operation for the resource, determining whether the user is assigned as the owner of the resource;
   if the user is not the owner of the resource, displaying an actionable link indicating a second user who can grant permission for the user to perform the operation on the resource;
   upon a selection of the actionable link by the user, transmitting a request to the second user to change the permission so the user can perform the operation on the resource, wherein the request comprises a parameter that identifies a network location associated with the resource; and
   when the second user changes the permission for the user to perform the operation on the resource, performing the operation on the resource.

2. The one or more computer storage media of claim 1, further comprising using the operations engine automatically attempting to acquire the permission.

3. The one or more computer storage media of claim 1, further comprising:
   evaluating whether the user owns the resource; and
   if the user owns the resource, granting the user the permission for the resource.

4. The one or more computer storage media claim 1, further comprising using the operations engine for determining whether the user is authorized to take ownership of the resource if the permission associated with the resource is acquired by the operations engine.

5. The one or more computer storage media of claim 4, wherein, if the operations engine determines the user is authorized to take ownership of the resource, the operations engine performs steps including:
   taking ownership of the resource for the user; and
   granting to the user the permission to perform the operation for the resource.

6. The one or more computer storage media of claim 4, wherein, if the operations engine determines the user is not authorized to take ownership of the resource, the operations engine performs steps including:
   determining a security entity to take ownership of the resource;
   identifying the security entity to the user;
   receiving a user request to ask the security entity to grant the user permission to perform the operation for the resource; and
   sending a permission request to the security entity to grant the user permission to perform the operation for the resource.

7. The one or more computer storage media of claim 6, wherein the step of sending the permission request to the security entity includes sending an email request to the security entity.

8. The one or more computer storage media of claim 6, wherein the step of sending the permission request to the security entity includes sending the actionable link to the security entity, the actionable link providing the security entity with a link to the resource.

9. The one or more computer storage media of claim 1, wherein the resource includes an object.

10. The one or more computer storage media of claim 9, wherein the object includes one of a file and a folder.

11. One or more computer storage media having computer-executable instructions for performing steps comprising:
   receiving a request to perform an action on a resource of a computer system, the request is associated with a first user identified by a security system of the computer system;
   attempting to perform the action in parallel threads;
   determining the first user lacks permission for the resource based on at least one security identifier (SID) associated with the resource and at least one system access control list (SACL) associated with the resource, wherein the SACL controls how a security subsystem audits attempts of different entities to access the resource;
   displaying a dialog, the dialog notifies the first user of a lack of permission to access the resource and provides the first user with an actionable link to a second user who can change one or more permissions of the resource so the first user can access the resource;
   receiving an indication from the first user requesting the second user to change the one or more permissions of the resource so the first user can access the resource;
   in response to receiving the indication, sending a permission request to the second user to grant the first user permission to access the resource, wherein the permission request comprises the actionable link that, when selected by the second user, initiates an operations engine for granting the first user permission to access the resource;
   receiving, from the second user, instructions to change the at least one SID associated with the resource to allow the first user permission to access the resource;
   modifying the at least one SID according to the instructions of the second user; and
   performing the action on the resource.

12. A method for performing operations on a computer, the method comprising:
   establishing access control information for a first security entity of a computer system;
   receiving, at an operations engine of the computer system, an operations request to perform an operation for a resource of the computer system, the operations request indicating the first security entity;
   determining whether the first security entity lacks permission for the operation based on at least one security identifier (SID) associated with the resource and at least one discretionary access control list (DACL) associated with the resource, wherein the DACL comprises one or more access control entries (ACES) applicable to one or more entities;

initiating performance of the operation if the first security entity has permission for the operation;

if the first security entity lacks permission for performing the operation for the resource, notifying the first security entity of a lack of permission error and providing the first security entity with an option to acquire the permission for the operation, wherein the option comprises an actionable link that, when selected, initiates an instant message to a user requesting the user to modify the at least one SID so the first security entity can perform the operation;

receiving a selection of the actionable link; and based on the user modifying the at least one SID, granting the first security entity permission for performing the operation.

13. The method of claim 12, further comprising the operations engine automatically attempting to acquire the permission.

14. The method of claim 12, wherein the operation for the resource includes:

evaluating whether the first security entity owns the resource; and if the first security entity owns the resource, granting the first security entity the permission for the resource.

15. The method of claim 12, wherein, if the permission is not acquired after an attempt, using the operations engine to determine whether the first security entity is authorized to take ownership of the resource.

16. The method of claim 15, wherein, if the operations engine determines the first security entity is authorized to take ownership of the resource, the operations engine performs the method including:

taking ownership of the resource for the first security entity; and granting to the first security entity the permission to perform the operation for the resource.

17. The method of claim 15, wherein, if the operations engine determines the first security entity is not authorized to take ownership of the resource, the operations engine performs the method including:

determining a second security entity to take ownership of the resource;

identifying the second security entity to the first security entity;

receiving a request to ask the second security entity to grant the first security entity permission to perform the operation for the resource; and sending a permission request to the second security entity to grant a user permission to perform the operation for the resource.

18. The method of claim 17, wherein the sending the permission request to the second security entity includes sending an email request to the security entity.

19. The method of claim 17, wherein the sending the permission request to the second security entity includes sending the actionable link to the security entity, the actionable link providing the security entity with a link to the resource.

* * * * *

UNITED STATES PATENT AND TRADEMARK OFFICE
CERTIFICATE OF CORRECTION

PATENT NO. : 7,580,933 B2
APPLICATION NO. : 11/191070
DATED : August 25, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this

Fourteenth Day of September, 2010

David J. Kappos
*Director of the United States Patent and Trademark Office*